United States Patent [19] [11] 4,122,882
Fisher et al. [45] Oct. 31, 1978

[54] WHEEL RIM
[75] Inventors: Peter M. Fisher, Semington; James A. Matsumiya, London, both of England
[73] Assignee: TSB International N.V., Curacao, Netherlands Antilles
[21] Appl. No.: 744,156
[22] Filed: Nov. 22, 1976

Related U.S. Application Data
[63] Continuation of Ser. No. 572,627, Apr. 28, 1975, abandoned.
[51] Int. Cl.$^2$ .............................................. B60B 21/00
[52] U.S. Cl. ............... 152/381.2 WC; 152/381.2 WF
[58] Field of Search ................................ 301/95–98; 152/366, 375, 381.1, 381.2, 388–392, 396, 399–401, 381.5, 381.6; 285/410, 411, 419

[56] References Cited
U.S. PATENT DOCUMENTS

| 632,028 | 9/1899 | Smith | 152/400 |
| 1,820,857 | 8/1931 | Wilson | 301/97 |
| 2,737,402 | 3/1956 | Frumerie et al. | 285/419 |
| 3,933,392 | 1/1976 | Wells | 152/366 |

FOREIGN PATENT DOCUMENTS

| 769,622 | 10/1967 | Canada | 285/419 |
| 111,616 | 12/1928 | Fed. Rep. of Germany | 302/96 |
| 2,405,141 | 8/1975 | Fed. Rep. of Germany | 152/399 |

Primary Examiner—Stanley H. Tollberg
Assistant Examiner—H. Grant Skaggs
Attorney, Agent, or Firm—Kenyon & Kenyon, Reilly, Carr & Chapin

[57] ABSTRACT

In a well obstructor for a steel wheel lugs are shown for ensuring axial (and optionally radial) positioning of the obstructor relative to the wheel rim. Preferably such lugs are turned out of the material of a band-like obstructor across at least part of its axially intermediate portion. They may be punched and bent out of a metallic such band.

It is also disclosed how such a band and its retainers may be adapted for automatic assembly on to the rim by being respectively placeable on the rim along respective radial straight lines.

7 Claims, 10 Drawing Figures

WHEEL RIM

This is a continuation of application Ser. No. 572,627, filed Apr. 28, 1975 (now abandoned).

FIELD OF THE INVENTION

This invention relates to wheel rims and to wheels and to tire and wheel assemblies incorporating such rims.

BACKGROUND OF THE INVENTION

In an earlier proposal shown in U.S. Pat. No. 3,933,392, issued on Jan. 20, 1976 to William Neil Wells, later abandoned in favor of copending continuation application Ser. No. 550,281, now U.S. Pat. No. 3,933,392 it was shown how the safety of a wheel and tire assembly may be enhanced by removably obstructing a well of a rim, lying between bead seats at the edges of the rim, so that it is not available to the beads of the tire mounted on the rim. The obstructor is positively held against circumferential expansion. Then if the tire suddenly loses air there is no risk of the beads escaping from the rim, something which can cause disastrous loss of control.

In co-pending application No. 537,706 (now abandoned) also assigned to the original assignee of the present application and in co-pending Canadian Pat. No. 990,327, also assigned to assignee of the present application, there was disclosed a specific form of obstructor suitable for use when the wheel rim is formed of steel. This is usually done by a pressing process. Because it is not practicable to machine a seating ledge for a band-like obstructor at the mouth of a well of such a rim, that patent shows, in its broadest aspect, how an obstructor can be positioned relative to a well of a steel rim by surfaces projecting radially inwardly to abut against a radially inward surface of the well. Specifically, for a band-like obstructor the surfaces were provided by lugs inturned from lateral edges of the band, to be face to face against side walls of the well.

SUMMARY OF THE INVENTION

The present disclosure shows other specific means for achieving the general purpose: notably lugs may be provided by tongues punched out of a central portion of the width of the band and bent to extend radially inward from it. These may be provided at a plurality of positions around the circumferential length of the band; particularly suitably they are provided at the circumferential ends of the band or of portions of the band where they may additionally engage with retainer means holding or drawing together adjacent said ends so as to hold the band against circumferential expansion.

Suitably those retainer means may have a shank with an enlargement at each end, the shank passing through a slot in each of the inturned lugs which is open to the radially outer end of the lugs, whereby the shank may be introduced into the slots by movement in a radially inward direction. The enlargements at at least one of the ends of the shank may be formed when the retainer means is already in position, for example by upsetting one end of the shank of a headed rivet; alternatively the retainer means may be a turnbuckle with a head already at each end and able to be screwthreadedly drawn together. The or each slot will have a portion extending into the circumferentially disposed part of the band having, to allow passage of a preformed head or heads of a retainer means, an enlargement at its end remote from the lug.

The obstructor may be unitary, with only two ends, or may be in a plurality of parts, preferably no more than two.

Particularly advantageous embodiments of the present invention are adapted for assembly in in-line (assembly-line) fashion, with the obstructor band or its component parts and the retainer means being insertable into the rim in respective straight radial directions.

The invention includes also a wheel with a rim embodying the present invention, and an assembly of such a wheel and a tubeless tyre mounted on it, with its beads engaging permanent bead seats of the rim, one each lateral side of the wall.

DESCRIPTION OF THE DRAWINGS

In the accompanying drawings

DESCRIPTION OF PREFERRED EMBODIMENTS

Figure 1:
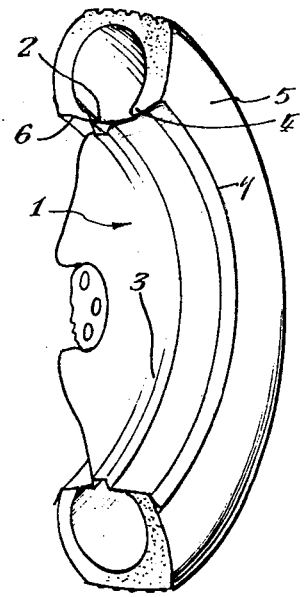
FIG. 1 is a section through a tyre and wheel assembly.
Figure 2:
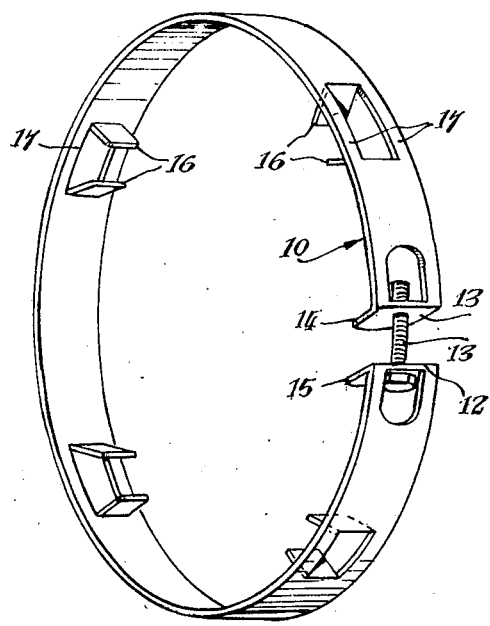
FIG. 2 is a perspective view of a first obstructor band.

FIG. 1 shows how when in position on a rim 1 an obstructor here given the reference 2, held in position inextensibly and against circumferential expansion by retainer means acting between its ends, denies access to a well 3 of the rim to the beads 4 of a tubeless tyre 5 mounted on the rim, with the beads 4 seated on bead seats 6 on each lateral side of the well 3 and adjacent respective bead flanges 7. The well 3 is disposed in the base of the rim. The bead flanges 7 are disposed at each axial side of the base. The rim is of pressed steel and forms part of a vehicle wheel 8. All this is as generally discussed and described in the said co-pending Application.

The inextensible obstructor may take one of the forms about to be described.

The first form is a band 10 continuous between two ends 11, 12 which are adjacent when the band is positioned on a rim (the band is shown in this conformation) and which can be held and tightened circumferentially together by nut and bolt 13 passing through holes in radially inturned end lugs 14, 15. Alternative retainer means and arrangement of the said lugs will be described with reference to further embodiments.

Figure 9:
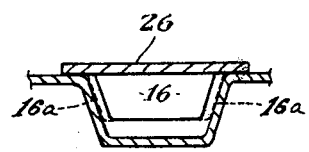
FIG. 8 is a perspective view of a fourth band and
FIG. 9 is a representative radial sectional view through part of a rim with any of the first second or third obstructor bands in position.

At intervals along the circumferential length of the band 10 are punched out pairs of tongues 16, four pairs in this embodiment. They are defined by cuts in the middle portion of the width of the band so as to leave continuous edge portions 17, and are bent out of the band so as to form lugs which project radially inwardly, at an angle of, say, 70° to 90° to the tangent to the band at the root of the respective tongue. The lateral edges of each tongue taper together so that those lateral edges conform generally to the taper of a well into which the lugs will project (see FIG. 9). The extent of inward projection of the lugs may be such that the radially innermost end abuts the base of the well, to define the radial position of the band relative to that base, or the positioning may be provided solely by abutment of the lateral edges of the lugs with the tapering side walls of the well. The lateral edges of the band, and the portions 17, may be positioned within the mouth of the well or, as shown in FIG. 9, may overlap over adjacent edges of the base of the rim so as to bridge the well entirely, the lugs then providing stops against lateral (axial) displacement of the band.

The other forms of band to be described are two-part. One pair of adjacent ends may be hinged together at a permanent circumferential spacing from each other while the other pair is provided with retaining means for releasably holding the band together under tension against circumferential expansion, or both ends may be provided with retaining means.

Figure 3:
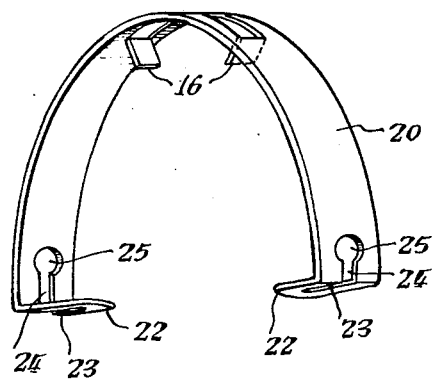
FIG. 3 is a perspective view of one part of a second obstructor band.
Figure 4:
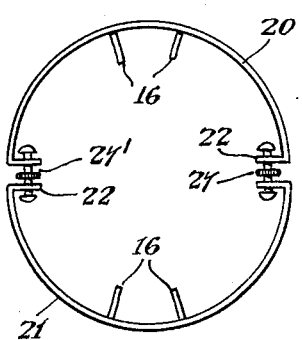
FIG. 4 is a schematic drawing showing the part band of FIG. 3 assembled with another such part.
Figure 5:
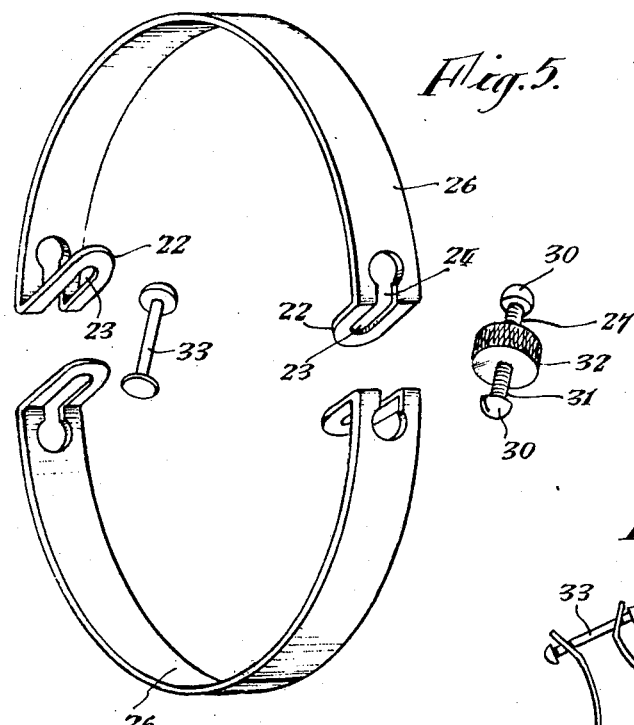
FIG. 5 is a perspective view of a third obstructor band.
Figure 6:
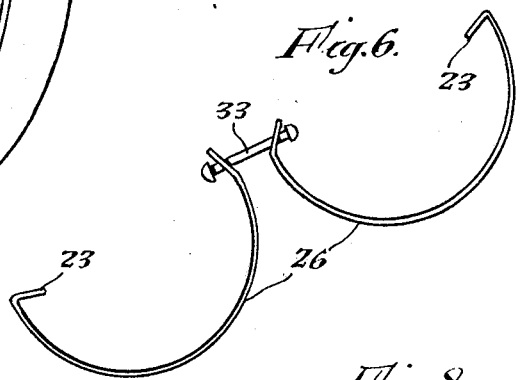
FIG. 6 is a schematic view of the third band partly disassembled.
Figure 10:
FIG. 10 is a representative radial sectional view through part of a rim with any of the first, second or third obstructor band in position and showing a lug of a band abutting the base of the well in the rim.

In the form shown in FIGS. 3 and 4, for example an obstructor band is made up of two half-bands 20, 21, which are identical. Each has a pair of tongues 16 and inturned end lugs 22, all of which are shaped and dimensioned appropriately to act as positioning means for the band when placed in the well of a rim. Each end lug 22 has a radially extending slot 23 of which the radially outer end is open, and joins into a circumferentially extending slot 24 in the band part. Each slot 24 has an enlargement 25 at its end remote from the end lug 22. In FIG. 9, the lateral edges 16a of a lug are shown by dash lines as having moved into abutment with either of the side walls of the well. In FIG. 10, the radially innermost end 16b of a lug is shown abutting the base of the well. The form shown in FIGS. 5 and 6 is similar. Half bands 26 are identical and very like half-bands 20 except that the tongues 16 are omitted. End lugs 22 have slots 23, and there are sots 24 and enlargements 25, as before.

Figure 7:
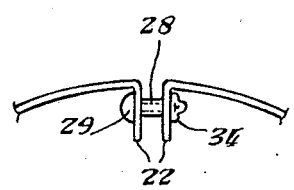
FIG. 7 is a plan view of an alternative retainer means for the third band.

The slots 23, 24 are to allow the insertion in a straight line and from a radial direction of a retainer means such as a turnbuckle 27 (FIG. 5) or rivet 28 (FIG. 7). One or both of the enlargements 25 allows passage in that direction of the enlarged head 29 at one end of the shank of the rivet 28 or of the enlarged heads 30 at each end of the shank 31 of the turnbuckle 27. The shank 31 of the turnbuckle is made up of a pair of screws threaded in opposite senses and engaged by an appropriately screwthreaded sleeve 32. Rotation of the sleeve 32 causes expansion or contraction of the shank, to move the heads 30 further apart from or closer to each other.

As illustrated in FIG. 4 turnbuckles 27, 27' may be fitted between both of the pairs of ends of the half-bands 20, 21: alternatively a hinge element may be provided in place of the turnbuckle 27', preferably having the same mass as the turnbuckle 27. One suitable form is seen at 33, FIG. 5 being a double headed rod. This may be positioned before the half bands 25 are brought near a rim so that it may be offered to the rim in the conformation seen in FIG. 6 and then closed together.

Alternatively if the half bands are not previously hinged together they may be offered up from opposite directions, and retaining means inserted from respectively opposite radial directions, perpendicular to the first-mentioned such direction; at each pair of adjacent ends of half-bands.

Then the shank of the turnbuckle 27 is shortened so that the heads 30 no longer register with the enlargement 25 (so that they can no longer escape radially outwardly) but come to bear on the mutually remote surfaces of the lugs 22 adjacent the slots 23. Thus they hold the lugs and hence the band together under circumferential tension when it is placed on a rim.

If retainer means such as rivet 28 is used it may again be inserted from a radial direction and then an enlargement 34 by formed in the shank so as to hold the lugs 22 firmly together. The rivet may be a pop rivet with a hollow shank. Although the use of a rivet is advantageous under in-line conditions of assembly, the bands are only releasable by destruction of the rivet.

The forms of construction described with reference to FIGS. 3 to 7 are able to be subjected to automatic or semi-automatic assembly steps in in-line fashion.

Figure 8:
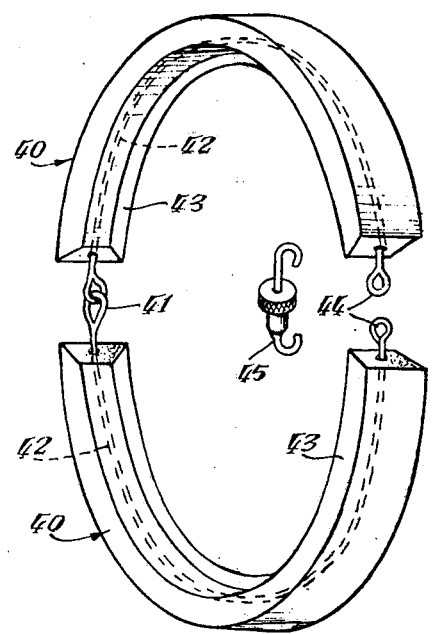

In FIG. 8 we show how the obstructor of a steel wheel rim may take the form of a pair of solid half-ring elements 40 hinged together at 41 at one pair of adjacent ends by a permanent interlocking between looped ends of a pair of core wires, cables or bands 42, which are embedded in substantially semicircular elements 43 of rubber or similar material and which are dimensioned and sectioned to occupy and fill up the well of a rim. Looped ends 44 of the core wires 42 are retained together by hooks of a turnbuckle 45 analogous to turnbuckle 27. A counterweight to balance the turnbuckle 45 may be provided at or between the ends 41.

We claim:

1. A wheel rim having an axis, a cylindrical base coaxial with the axis of the rim and having a predetermined diameter, an annual flange extending outwardly from each axial side of the base, spaced-apart annular seats for respective beads of an inextensible bead tubeless pneumatic tire on the base respectively adjacent each flange, an annular well in the base axially between the bead seats and projecting radially inwardly of the bead seats, the well being any one of a plurality of different size wells in a base of the said predetermined diameter and having side walls and a well base the dimensions of which determine the size of the well, and an annular well obstructor adapted to obstruct any one of a plurality of different size wells in wheel rims having a cylindrical base of the substantially common predetermined diameter, the obstructor comprising an axial width less than the distance between the bead seats and having ends disposed adjacent one another, the obstructor including a band of inextensible material having a thickness which is a fraction of the depth of the well, the band being positionable around the rim to lie at the mouth of the well and extending across the well and free of the bead seats, and retaining means independent of the presence, position or condition of inflation of any tire on the rim, the retaining means being directed tangentially to the axis of the rim and acting between adjacent ends of the obstructor band to draw them together and hold the band in tension positively against radial or circumferential expansion, the obstructor further including lugs disposed at an angle to the band and directed along the width of the band spaced apart from one another circumferentially of the band to be substantially opposed to each other across the rim, the lugs having a thickness which is a fraction of the depth of the well and projecting radially inwardly of the band and lying radially between the level of the band and the level of the base of the well, edges of the lugs being adapted to delimit a position of the obstructor relative to the rim in at least the axial direction, whereby the band is held coaxially with the rim at the mouth of any one of a plurality of different size wells in a wheel rim having a base of substantially common diameter to deny access to any substantial part of the circumferential length of the well to the beads of any tire on the rim.

2. A wheel rim according to claim 1 wherein the obstructor is adapted for the retaining means to be inserted at adjacent ends of the obstructor from a radial direction.

3. A wheel rim according to claim 2 wherein the retaining means include a shank with an enlarged head at each end portion of the shank, there being a radially directed and radially outwardly open slot in each said adjacent end portion of the obstructor, the slot being of a width to allow passage of the shank but not of the head, and an abutment for the head adjacent the slot.

4. A wheel rim according to claim 1 wherein the band has a cylindrical portion of which a radially outer surface is of a radius substantially that of the cylindrical base of that of the rim and the lugs are radially inwardly extending punched-out portions of the material of the band bent out of the cylindrical portion of the band at an intermediate portion of the width thereof.

5. A wheel rim according to claim 1, wherein the obstructor comprises a plurality of elongate parts, the retaining means acting between each adjacent pair of ends of the said elongate parts, and means in at least one said end of each adjacent pair of ends for receiving said retaining means from a substantially radial direction of the rim.

6. A wheel rim according to claim 1 wherein the radially innermost edges of the lugs abut the base of the well to position the obstructor radially of the rim.

7. An obstructor for a wheel rim having an axis, a cylindrical base coaxial with the axis of the rim and having a predetermined diameter, an annular flange extending outwardly from each axial side of the base, spaced-apart annular seats for respective beads of an inextensible bead tubeless pneumatic tire on the base respectively adjacent each flange, an annular well in the base axially between the bead seats and projecting radially inwardly of the bead seats, the well being any one of a plurality of different size wells in a said rim and having side walls and a well base the dimensions of which determine the size of the well, being adapted to obstruct any one of a plurality of different size wells in wheel rims having a cylindrical base of a substantially common diameter, the obstructor comprising a band having an axial width less than the distance between the bead seats and ends disposed adjacent one another, the band being of inextensible material and having a thickness which is a fraction of the depth of the well, the band being positionable around the rim to lie at the mouth of the well and extending across the well and free of the bead seats, the obstructor further comprising retaining means independent of the presence, position or condition of inflation of any tire on the rim, the retaining means being directed tangentially to the axis of the rim and acting between adjacent ends of the band to draw them together and hold the band in tension positively against radial or circumferential expansion, the obstructor further comprising lugs disposed at an angle to the band and directed along the width of the band, spaced apart from one another circumferentially of the band to be substantially opposed to each other across the rim when positioned around the rim, the lugs having a thickness which is a fraction of the depth of the well and projecting radially inwardly of the band and lying radially between the level of the band and the level of the base when the obstructor is mounted at the mouth of the well, edges of the lugs being adapted to delimit a position of the obstructor relative to the rim in at least the axial direction, whereby the band is adapted to be held coaxially with the rim at the mouth of any one of a plurality of different size wells in a wheel rim having a cylindrical base of a substantially common predetermined diameter, to deny access to any substantial part of the circumferential length of the well to the beads of any tire on the rim.

* * * * *

UNITED STATES PATENT OFFICE
CERTIFICATE OF CORRECTION

Patent No. 4,122,882                Dated October 31, 1978

Inventor(s) Peter M. Fisher, et al

It is certified that error appears in the above-identified patent and that said Letters Patent are hereby corrected as shown below:

Column 1, lines 25-26, after "(now abandoned)", delete --also--.

Column 3, line 15, after "well.", insert --In Figure 9, the lateral edges 16a of a lug are shown by dash lines as having moved into abutment with either of the side walls of the well. In Figure 10, the radially innermost end 16b of a lug is shown abutting the base of the well.--.

Column 3, lines 37-40, after "lug 22." delete --In FIG. 9. . . base of the well.--.

Column 3, line 45, delete "sots" and insert --slots--.

Signed and Sealed this

Sixth Day of March 1979

[SEAL]

Attest:

RUTH C. MASON
Attesting Officer

DONALD W. BANNER
Commissioner of Patents and Trademarks